W. BALLENTIN, KNOWN AS MIELKE ET AL

1,919,876

MOTOR GEAR

Filed Jan. 21, 1931   6 Sheets-Sheet 5

Patented July 25, 1933

1,919,876

UNITED STATES PATENT OFFICE

WALTER BALLENTIN, KNOWN AS MIELKE, AND ERICH UHLICH, OF BERLIN-HIRSCHGARTEN, GERMANY

MOTOR GEAR

Application filed January 21, 1931, Serial No. 510,304, and in Germany August 12, 1930.

This invention relates to a motor gear, more particularly for automobile vehicles, wherein the braking, the idle running and the forward and backward motion are controlled by a single lever, which automatically and uniformly adjusts itself according to the load to be driven and automatically couples and uncouples itself in dependence upon the speed of revolution.

In an earlier patent application Serial No. 439,632, filed March 28, 1930 a gear has been described in which for this purpose there is interposed between the driving and driven shafts, in addition to one or more planet-wheel gears, a centrifugal clutch, so that the torque of the driving shaft is transmitted to the driven shaft through the planet wheels and through the centrifugal clutch in approximately equal shares.

This constructional form of the gear is however not very economical in those cases in which, as for example in long continued ascents, a rather forcible braking of the clutch members on the case-like part of the driven shaft occurs, and consequently heat is evolved, the removal of which necessitates special measures. In order to remove this disadvantage the gear according to the present invention acts in such a way that the transmission of power from the driving shaft to the driven shaft is almost completely effected by the planet wheels interposed between them, which, with their carrier or carriers are freely rotatable about the axis of the driving shaft. The transmission ratio between the driving shaft and the driven shaft adapted to the particular resistance of the existing load, is thus regulated by means which influence the speed of revolution of the planet-wheel carriers in dependence upon the speed of revolution of the motor and the resistance of the load, so that the most advantageous transmission ratio between the driving shaft and the driven shaft, adapted according to the existing working conditions, is automatically adjusted.

A particularly simple embodiment of the invention is obtained if the means that serve for regulating the speed of revolution of the carrier or carriers of the planet wheels are influenced by the speed of revolution of the driving shaft, and if the latter, in dependence upon the speed of revolution of the driving shaft, meet with a resilient resistance on the driven shaft, the amount of which depends upon the magnitude of the work to be done.

These means serving for regulating the speed of the planet-wheel carriers advantageously act in the manner of an elastic coupling, by serving for the partial transmission of the power from the driving shaft to the driven shaft.

The arrangement is preferably such that the driven shaft is driven in the same direction of rotation by the means acting upon it in the manner of an elastic clutch for regulating the speed of the planet-wheel carriers, as by the antagonistic force, which the resistance of the driven shaft exerts through the elastic clutch upon the planet-wheel carrier or carriers.

There is then interposed between the means acting as an elastic clutch for regulating the speed of the planet-wheel carriers, and the planet-wheel carriers freely rotatable about the axis of the motor, a transmission ratio of such magnitude that the elastic coupling bears with the minimum possible application pressure upon the driven shaft, this pressure being just sufficient to exert a regulating influence upon the rotation of the planet-wheel carriers in dependence upon the speed of revolution of the motor and the resistance of the load.

For this purpose there may most simply be used an additional speed in the gear or an additional stepped pinion, which acts through the driving shaft indirectly or directly upon the means constructed as an elastic clutch for the purpose of regulating the speed of revolution of the planet-wheel carriers.

These means for regulating the speed of revolution of the planet-wheel carriers may be constructed as a laminated disc clutch, which, with one or more discs movable in the direction of the driving axis, under the action of centrifugal force, bear against suitably shaped surfaces connected with the driven shaft.

Another constructional form of the means constructed as an elastic coupling for regulating the speed of revolution of the planet-wheel carriers consists in the fact that clutch members are employed shaped like sliding jaws and rotatable about the axis of the driving shaft, the said clutch members bearing under the action of centrifugal force on case-like parts of the driving shaft, and being connected with the carrier or carriers of the planet wheels through a toothed wheel transmission, and being returned by springs into their position of rest. This kind of elastic coupling is particularly effective when the sliding jaw clutch members, under the action of centrifugal force, are attached to the planet-wheel carriers freely rotatable about the driving shaft, preferably to bell-shaped projections on the planet-wheel carrier or carriers.

It is also possible to utilize as means for regulating the speed of revolution of the planet-wheel carriers one or more brake bands, which bear, under the action of centrifugal force, upon or in suitably shaped drum-like members, which are connected with the driven shaft.

In many cases, for instance when starting on particularly difficult ground, it may be an advantage, by disconnecting the means serving for regulating the speed of the planet-wheel carrier or carriers, to drive the load directly through the planet wheel gear. For this purpose according to the invention the carrier of the planet wheels serving at the same time for the speed reduction, is braked in its rotary motion in relation to the driving shaft, so that the engine power acts directly according to the transmission ratio of the planet wheels.

This fixing of the planet-wheel carrier or carriers is preferably effected by means of a brake drum adapted to be engaged and disengaged by means of a pedal, and connected indirectly or directly with the planet-wheel carrier.

Further possibilities in the design of the gear according to the invention will be gathered from the constructional examples hereinafter described.

The invention is illustrated by way of example in the accompanying drawings, in which.

Figure 1:
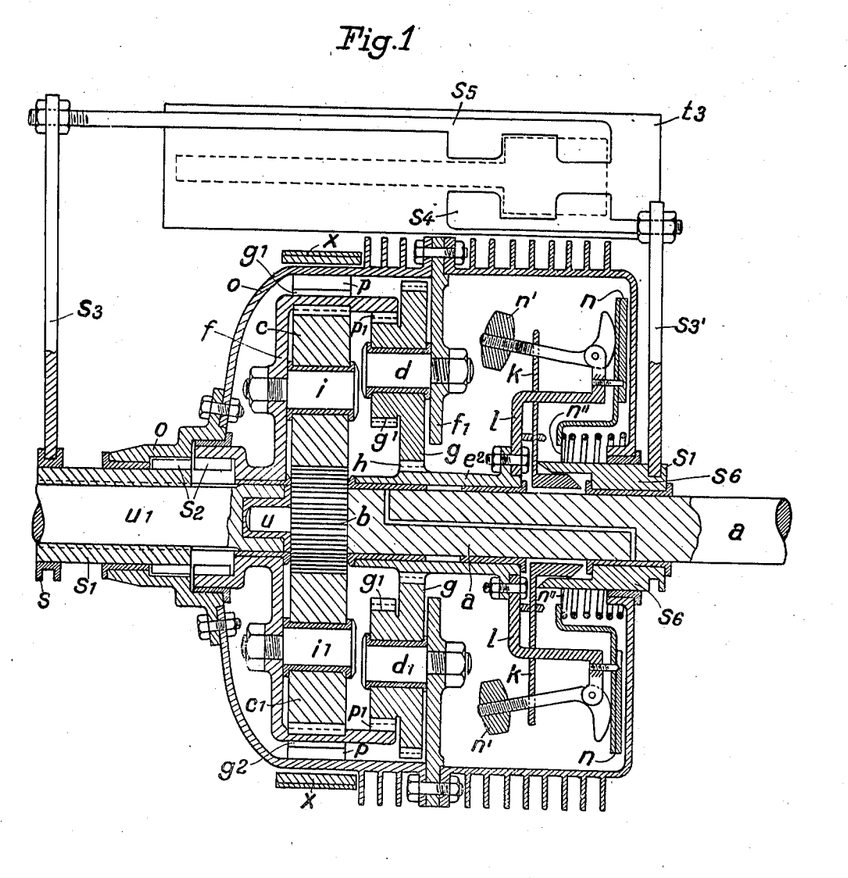
Figure 1 shows a longitudinal sectional elevation of one form of the invention.

In Figure 1 is illustrated in a purely diagrammatic manner a constructional form of the gear, in which the means for regulating the speeds of revolution of the planet wheel carrier consist in a laminated disc clutch subject to centrifugal action.

Figure 2:
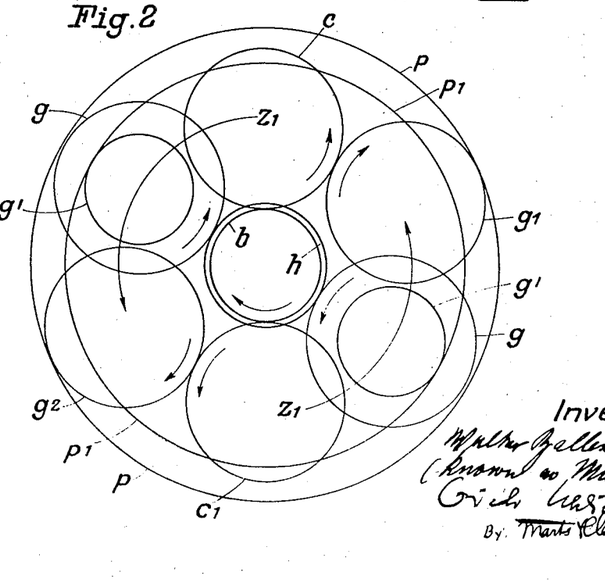
Figure 2 shows diagrammatically a cross section of the same form.

The planet wheels $c$ and $c_1$ are driven by a toothed wheel $b$ mounted upon the driving shaft $a$. They revolve about pivots $i$ and $i_1$ respectively on a carrier $f$, which is freely rotatable about the axis of the driving shaft, and which revolves, in consequence of the engagement of intermediate wheels $g_1$ and $g_2$ with teeth $p$ on a casing $o$, releasably connected with the driving shaft and at first stationary, in a direction opposite to that of the driving shaft, as indicated by the arrows $z$ and $z_1$ in Figure 2. The planet-wheel carrier thereby sets in rotation, through the medium of its internal teeth $p_1$, stepped wheels $g$ and $g'$, which are carried by pivots $d$ and $d_1$, which are secured to the casing $o$ by carriers $f_1$. The wheels $g$ and $g'$ mesh by their larger steps with a central wheel $h$, which is mounted upon a sleeve $e_2$, which is freely rotatable upon the driving shaft $a$, and by means of the revolving stepped wheels $g$ and $g'$ sets in rotation arms $l$, the centrifugal weights $n'$ secured to it, and also the laminated disc $n$, this rotation being in the same direction as that of the driving shaft $a$.

In the position of the gear illustrated in Figure 1, however, the centrifugal weights $n'$ cannot press the laminated disc against the wall of the casing $o$, since the throw of the weights is limited by shoelike rods $k$, which are formed on their lower ends and in which the arms of the weights $n$, are guided in slots, because the clutch sleeve $s_6$ engages over the shoe of the rods $k$ and therefore prevent the latter from ascending. The gear illustrated in Figure 1 is therefore adjusted for idle running.

If, however, the clutch sleeve $s_6$ is shifted so far towards the right, by actuating the control rodding, that it releases the shoe of the rod $k$, the centrifugal weights fly out in an upward direction and press the laminated disc $n$ against the wall of the casing $o$, to an extent corresponding to the peripheral speed of the motor shaft $a$, against the action of the spring $n''$, and according to the transmission ratio of the gear. The peripheral speed of the planet-wheel carrier consequently undergoes a retardation, since the laminated disc $n$ bearing against the stationary drum $o$ exerts a braking action through the arms $l$ and the central wheel $h$ upon the stepped wheels $g$ and $g'$, and therefore upon the planet-wheel carrier $f$. As soon, however, as the speed of revolution of the planet-wheel carrier $f$ has diminished, the intermediate wheels $g_1$ and $g_2$ press with an increased pressure into the internal teeth $p$ of the drum $o$, and set the latter in motion as soon as the reaction of the laminated clutch upon the speed of revolution of the carrier $f$ has become sufficiently strong. This reaction is the greater, the greater the transmission ratio between the planet-wheel carrier and the laminated clutch. The transmission ratio readily admits of being adapted to all operating conditions by suitably dimensioning the stepped wheels $g$ and $g'$, and the size of the central wheel $h$, as well as that of the internal teeth $p_1$ of the planet-wheel carrier $f$.

In consequence of the construction of the gear illustrated the laminated disc clutch also acts upon the drum $o$ releasably connected with the driven shaft in the same direction of rotation as the intermediate wheels $g_1$ and $g_2$ do, when the speed of revolution of the carrier $f$ is being retarded. Then, however, the weight of the inertia masses $n'$ is so dimensioned that the disc $n$ only acts upon the casing $o$ with a small application pressure, which is great enough to effect a sufficiently strong braking of the planet-wheel carrier. The power transmitted through this part of the gear to the shaft $u_1$ is therefore as small as possible. Consequently the frictional work of the laminated disc against the wall of the casing $o$ is also reduced to a minimum.

As soon as the drum $o$, and with it the shaft $u_1$, has assumed the speed of the driving shaft, the relative movement of the gear parts ceases, and the latter form virtually a single rigid revolving body.

Upon the road resistance increasing, the speed of revolution of the centrifugal weights diminishes, so that the application pressure of the laminated disc also decreases, and accordingly a speed of rotation is adjusted between the motor shaft and the driven shaft, which is adapted to the magnitude of the resistance.

If, on the contrary, the rod resistance diminishes, when travelling down hill for example, the car does not go on without the brake being actuated. Its speed is on the contrary regulated according to the speed of revolution of the motor. It is therefore braked by the motor, since the driven shaft, owing to the action of the elastic clutch, cannot revolve faster than the motor shaft.

For braking purposes, and also for putting in forward and reverse speed, and for idle running, there serves one and the same lever, which engages with its claws $s_3$ and $s_{3'}$ in recesses $s$ and $s^1$ in longitudinally slidable sleeves $s_1$ and $s_6$.

By lateral deflection of the lever a brake band $x$ passing round the drum $o$ is tightened, so that the shaft $u_1$ is then stopped. If the lever is shifted towards the right, the sleeve $s_6$ is also displaced, so that the elastic clutch is engaged, as set forth above. If the control lever is then rocked laterally, so that the brake band $x$ is tightened and the drum $o$ stopped, the car runs backwards.

From this it follows therefore that when the car is to travel forwards, only the actuating of the accelerator is necessary in order to alter the speed of the car. The most suitable speed reduction of any particular load resistance and engine power is then obtained in a completely automatic manner without any manipulation by the driver.

Figure 3:
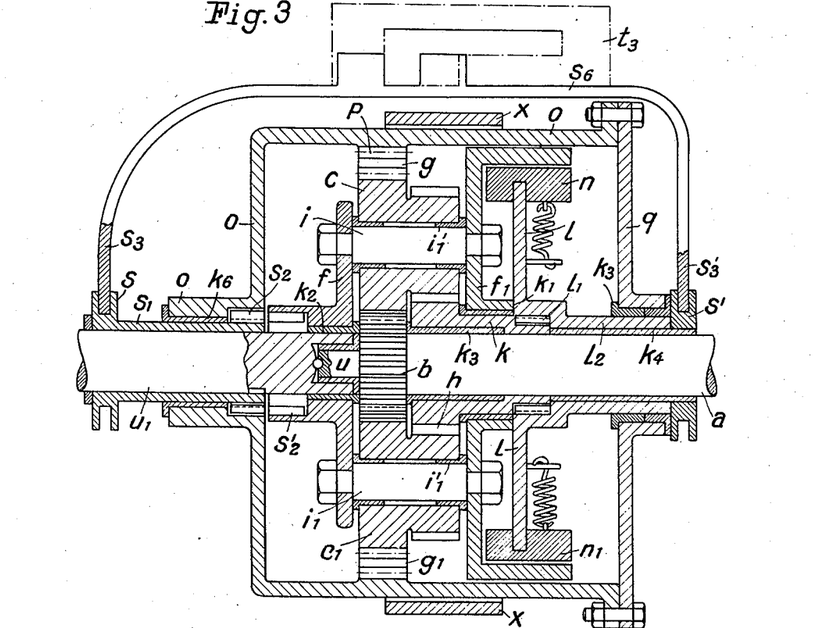
Figures 3, 4, 5 and 6 show longitudinal sectional elevations of other forms of the invention, Figure 5a being a diagrammatic cross section of the form illustrated in Figure 5, and Figure 7 a cross section of the form illustrated in Figure 6.

The constructional form of the gear illustrated in Figure 3 is distinguished from the one shown in Figure 1 in so far as here the means for regulating the speed of revolution of the carrier $f$ are constructed as members which bear, under the action of centrifugal force, against a suitably constructed prolongation of the planet-wheel carrier $f_1$. Thereby not only do the dimensions of the gear admit of being reduced, but owing to the attachment of the sliding jaws to the planet-wheel carrier, the effect of this device is also enhanced and the equalization of speed between the driving and driven shafts is accelerated. The method of working corresponds in other respects to that of the gear shown in Figure 1. The planet wheels $c$ and $c_1$ are in this case directly constructed as stepped wheels.

Figure 4:
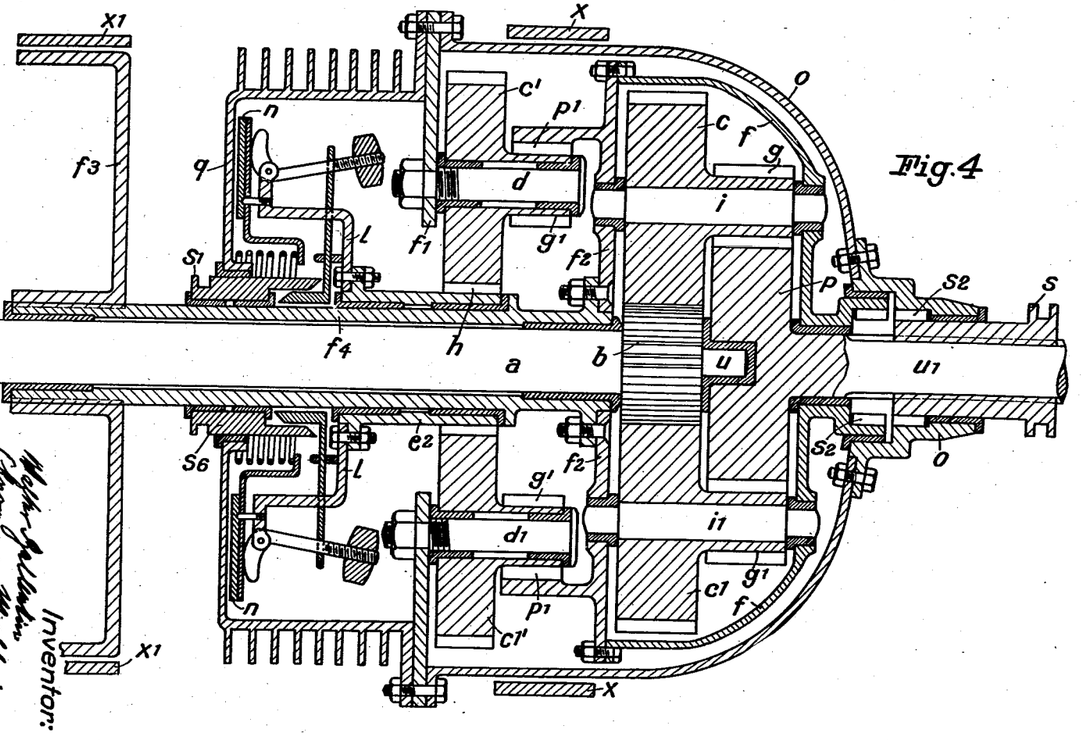

In Figure 4 is illustrated a constructional form of the gear according to the invention, in which the driving shaft $a$ drives by means of the toothed wheel $b$ the two planet wheels $c$ and $c_1$, which are rotatably supported in the pivots $i$ and $i_1$ of the planet-wheel carrier, and roll with the smaller steps $g$ and $g_1$ upon the toothed wheel $p$ which is rigidly connected with the driven shaft. The toothed wheel $p$ therefore stands in place of the internal teething $p$ of the bell $o$ of the gears according to Figures 1 and 3.

The planet-wheel carrier $f$, which in this case is bell-shaped, now transmits its speed of revolution through the internal teeth $p_1$ and stepped wheels $c'$ and $c_{1'}$, with the small step $g'$ to the toothed wheel $h$, and the means $l$, $n$ and $n'$, likewise constructed as a laminated clutch, for regulating its speed of revolution. The method of working therefore corresponds substantially to that of the form of construction illustrated in Figure 1.

Furthermore, however, in the gear according to Figure 4, a device is provided which is valuable if it is a question of driving the driven shaft, with temporary disconnection of the centrifugal clutch, directly through the speed-reducing gear. For this purpose the carrier $f$, $f_2$ of the planet wheels $c$ and $c_1$ is capable of being locked by the drum $f_3$ and the brake band $x_1$ through the sleeve $f_4$, so that in this way the engine power acts directly upon the driven shaft in accordance with the speed reduction of the planet wheels.

In order therefore that the driving shaft may be able to act directly upon the driven shaft through the speed reduction, when starting for example, without the means for regulating the speed of revolution of the planet-wheel carrier coming into operation, the planet-wheel carrier $f$ is held fast by the brake drum $f_3$, and the brake band $x_1$ by the sleeve $f_4$, engaging the bolts $i$ and $i_1$ and surrounding the driving shaft. By this means, therefore, the shaft $u_1$ is directly driven in accordance with the speed reduction formed by $b$, $c$, $c_1$ and $g$, $g_1$.

In order to prevent the grinding of the laminated surface $n$ on the casing $o$ during long hill climbs, particularly in the case of steep hills, with direct utilization of the speed reduction, the centrifugal weights, as already indicated in the case of the constructional form illustrated in Figure 1, may be stopped by means of the coupling piece $s_6$.

Figure 5:
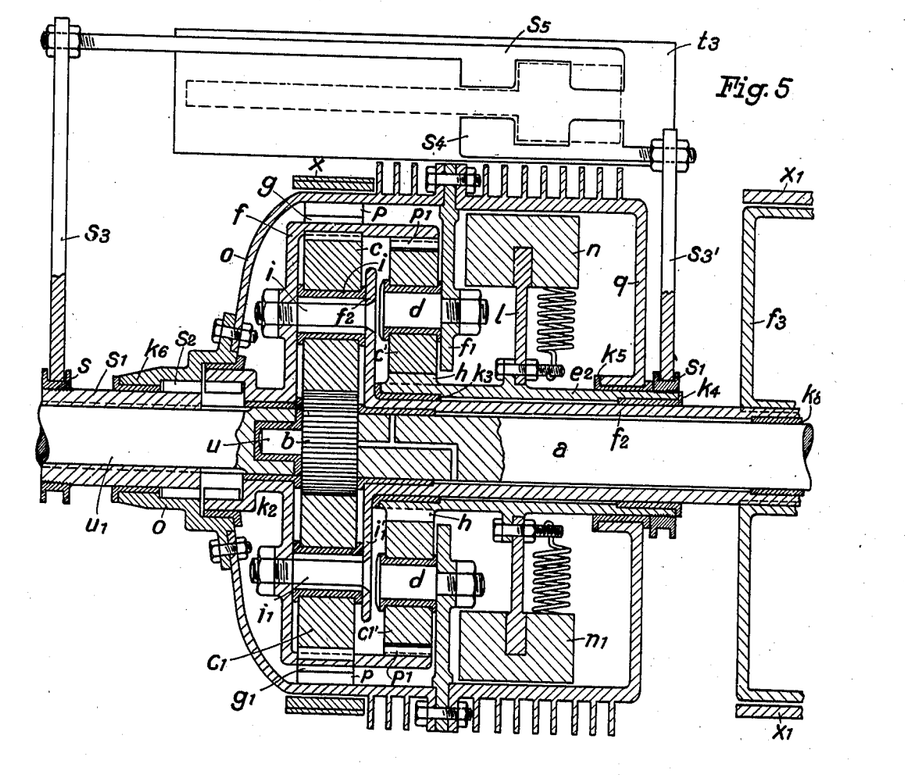
Figure 5A:
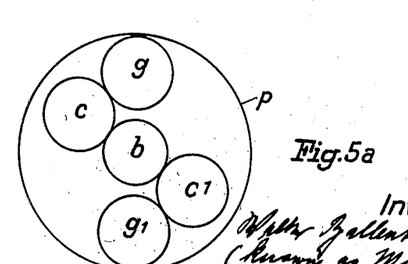

This may also be effected in exactly the same manner, however, by employing members shaped like sliding jaws and subjected to centrifugal action, as shown in Figures 5 and 5$a$. Here for example the members $l$, $n$, $n_1$ are disconnected from the planet wheels $c'$ and $c_{1'}$, the central wheel $h$ being brought out of engagement with the wheels $c'$ and $c_1'$ by displacing the claw $s_1$. For this purpose the control rodding $s_3$, $s_{3'}$, is made in two parts, so that by means of the hand lever that serves for braking, for engaging forward and backward travel, and also for idle running, by the engagement thereof in a recess in the rod $s_4$, the centrifugal coupling is engaged and disengaged.

This lever may of course also be utilized for stopping the brake drum $f_3$ and therefore the planet-wheel carrier $f$. For the latter purpose, however, the employment of a separate pedal is to be preferred.

Figure 6:
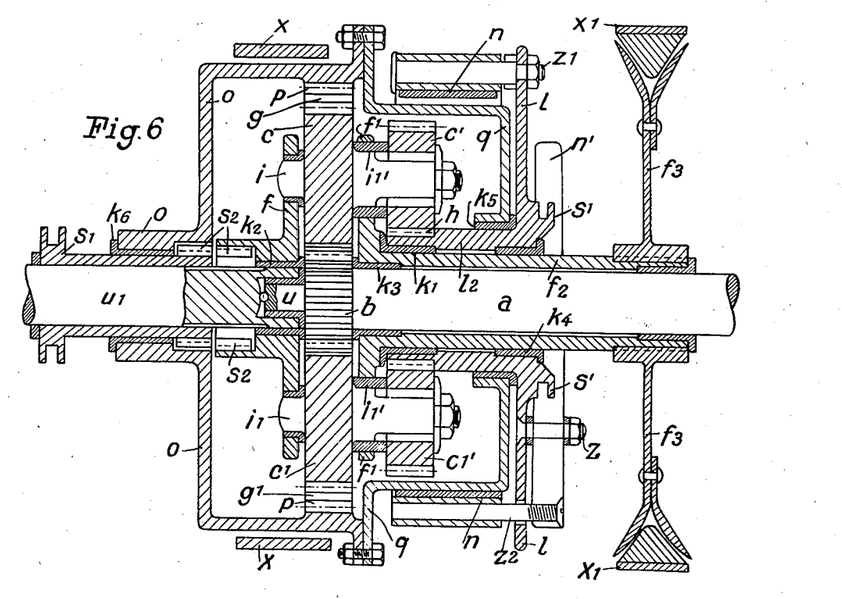
Figure 7:
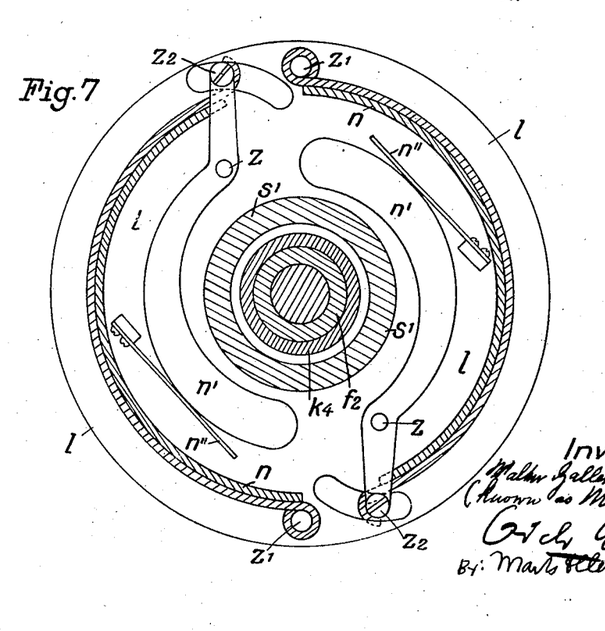

Figures 6 and 7 illustrate another possible construction of the means serving for regulating the speed of revolution of the planet-wheel carrier. Here the driving shaft $a$ acts upon the central wheel $h$ through the central wheel $b$, the planet wheels $c$ and $c_1$, the intermediate wheels $g$ and $g_1$ meshing with the internal teeth $p$ of the drum $o$, and the toothed wheels $c'$ and $c_{1'}$ mounted upon the pivots $i$ and $i_1$. The central wheel $h$, by means of the sleeve $l_2$, which is freely rotatable about the shaft $a$, sets the disc $l$ in rotation. The latter carries, by means of pivots $z$ secured to it, the centrifugal weights $n'$, which are constructed as lever arms and are rotatable about the pivots $z$, and which are brought into their position of rest by plate springs $n''$. Upon the disc two brake bands $n$ are secured by their ends to the pivot $z_1$, while by the other end they are attached to pivots $z_2$, which are secured to the free lever arms of the centrifugal weights $n'$, and pass through suitable apertures in the plate $l$. Of course it will also be possible to employ, instead of the brake bands, even brake shoes provided with cooling ribs. The brake bands $n$ bear upon the part $q$ of the casing with a force that depends upon the speed of revolution of the disc $l$, and in the same way exert a regulating action upon the speed of revolution of the carrier $f$ through the wheels $c'$, $c_{1'}$ and $h$. This construction has the advantage that the means for regulating the speed of revolution of the planet-wheel carrier are readily accessible, and a satisfactory removal of the small quantities of heat evolved is thereby also rendered possible. The disconnection of the planet-wheel carrier for the purpose of stopping by means of the brake drum $f_3$ is here effected in the same manner as was described in connection with Figure 5.

If the stopping of the planet-wheel carrier is effected by means of a pedal, the latter will preferably be provided with a ratchet and pawl mechanism, which holds it fast in its position, and also connected with a spring-actuated cone clutch or the like, which would be interposed between the central wheel $h$ and the brake-shoe carrier $l$, and is at the same time released by depressing the pedal, so that in this way by stepping on the pedal, not only is the planet-wheel carrier stopped, but the connection between $l$ and $h$ is also interrupted. By releasing the pedal from the ratchet and pawl mechanism on the other hand, the brake drum $f_3$ is released, and with it the planet-wheel carrier $f$; and the centrifugal clutch is also inserted in the gear.

Figure 8:
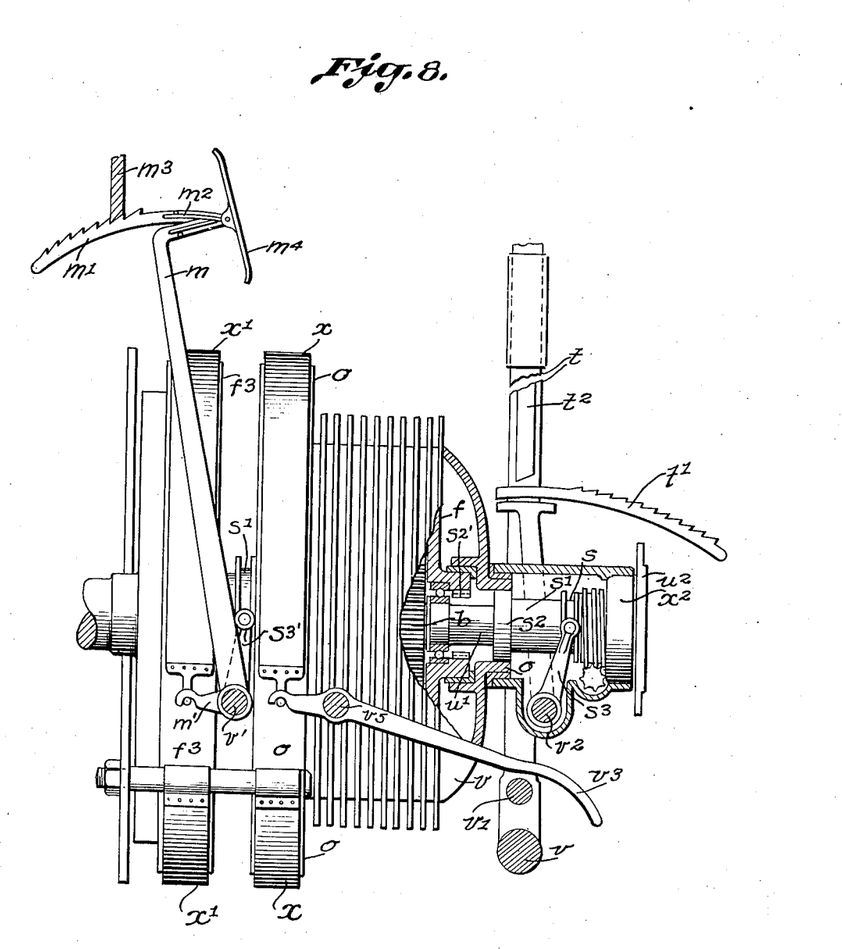

Fig. 8 shows a constructional form of such a control arrangement.

By depressing the pedal $m^4$, the lever $m$ turns the shaft $v^1$ on which it is fixed and on which the engaging claw $s^{31}$ and the lever $m^1$ are also secured. By this means, the sliding member $s^1$ is displaced in the direction towards the motor and at the same time the brake band $x^1$ is tightened on the brake drum $f^3$. If the upper edge of the pedal $m^4$ is pressed upon by the foot, then the ratchet mechanism $m^1$, $m^3$ is put out of action. If a constant transmission ratio is to be maintained for some time, then by means of the ratchet mechanism the lever $m$ is maintained automatically in the depressed position. In this position, the centrifugal brake is out of action owing to the displacement of the member $s^1$ and the carrier $f$, $f^1$ of the planet wheels is held stationary by the brake band $x^1$ through the medium of the drum $f^3$ and the hollow shaft $f^2$. Thus the full power of the driving wheel $b$ acts, through the planet wheels and the internal teeth $p$ secured to the casing $o$, on the cardan shaft.

The control lever $t$ can be rocked laterally and when so rocked is capable of displacing the member $v^4$ fixed on the shaft $v^2$ so that the finger $s^3$, likewise fixed on the shaft $v^2$, will bring driving member $s$, $s^1$, $s^2$ into engagement with the driving teeth of the casing $o$, with those of the carrier $f$ of the planet wheels or between these two. Fig. 8 shows the member $s$, $s^1$, $s^2$ in engagement with the driving teeth of the casing $o$. If for this adjustment, the control lever $t$ is drawn back, then the stud $v^2$ raises the brake lever $v^3$, the brake band $x$ being tightened up over the shaft $v^5$. By this means, the function of the hand lever is fulfilled. If the control lever is pulled back when the member $s$, $s^1$, $s^2$ is in engagement with the teeth $s^{21}$, then the drive takes place in the reverse direction. If the member $s$, $s^1$, $s^2$ is situated between the two sets of driving teeth then the gear runs idle.

The constructional possibilities of the invention upon which the gear is based are by no means exhausted by the above examples, for numerous further modifications to comply with various requirements might be provided by adopting the novel fundamental solution of the problem hereinbefore set forth.

What we claim is:—

1. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, said means for regulating the speed of revolution of the planet wheel carriers consisting of a laminated disc clutch, bearing surfaces rigidly connected with the driven shaft, centrifugal weights acting upon the laminated discs of the clutch and tending to force them into contact with the said bearing surfaces, antagonistic springs tending to counteract the action of the centrifugal weights upon the laminated discs, and means for putting the centrifugal weights out of operation when the gear is to run idly.

2. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, said means for regulating the speed of revolution of the planet wheel carriers consisting of bodies resembling sliding jaws, the transmission gear further comprising a slide track on the driven shaft, and the sliding jaw bodies being adapted to bear against the slide track under the action of centrifugal force and to transmit to the driven shaft a portion of the torque of the driving shaft.

3. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, said means for regulating the speed of revolution of the planet wheel carriers consisting of bodies resembling sliding jaws, the transmission gear further comprising a slide track on the driven shaft, and antagonistic springs tending to keep the sliding jaw bodies away from the slide track, the sliding jaw bodies being adapted to bear against the slide track under the action of centrifugal force, against the action of the antagonistic springs, and to transmit to the driven shaft a portion of the torque of the driving shaft.

4. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, said means for regulating the speed of revolution of the planet wheel carriers consisting of coupling pieces resembling sliding jaws, the transmission gear further comprising a bell-shaped projection on the planet wheel carriers, and the sliding jaw coupling pieces being adapted to engage with the bell-shaped projection on the planet wheel carriers under the action of centrifugal force.

5. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, said means for regulating the speed of revolution of the planet wheel carriers comprising a brake band, the transmission gear further comprising drum-shaped members connected with the driven shaft, and the brake band being adapted to bear against the drum-shaped members under the action of centrifugal force.

6. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, said means for regulating the speed of revolution of the planet wheel carriers comprising members of the nature of brake bands held fast at one end, the transmission gear further comprising a casing connected with the driven shaft, and weights in the form of double-armed levers attached to the brake-band members and adapted to tighten the brake-band members and press them against the casing under the action of centrifugal force.

7. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, said means for regulating the speed of revolution of the planet wheel carriers comprising members of the nature of brake bands held fast at one end, the transmission gear further comprising a casing connected with the driven shaft, weights in the form of double-armed levers attached to the brake-band members, adapted to tighten the brake-band members and press them against the casing under the action of centrifugal force, and plate springs tending to counteract the action of the centrifugal force.

8. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, said means for regulating the speed of revolution of the planet wheel carrier being constituted by a hood-shaped member having a cylindrical portion formed with apertures, the transmission gear further comprising intermediate wheels mounted in the said apertures, a ring of teeth on the cylindrical portion of the hood-shaped planet wheel carrier, further planet wheels meshing with the said ring of teeth and intermediate wheels and serving to drive the means for regulating the speed of revolution of the hood-shaped planet wheel carrier, a sleeve surrounding the driving shaft, and a brake drum adapted to co-operate with the said sleeve to stop the revolution of the hood-shaped planet wheel carrier.

9. Transmission gear for transmitting power from a driving shaft to a driven mechanism, more particularly intended for use in automobile vehicles, comprising a driven shaft connecting the driven mechanism with the gear, a lever adapted to control the braking, the idle running and the forward and reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a casing connected to the driven shaft and enclosing the planet wheel carrier, said casing being free to rotate with respect to the driving and driven shafts, centrifugal coupling means inside said casing and capable of movement into driving engagement with said casing, driving gearing connected to said planet wheels and centrifugal coupling means for transmitting the revolving motion of the former to the latter, said centrifugal coupling means being adapted to engage the casing yieldingly and driving means connected to said casing and planet wheel carrier for constraining the casing and planet wheel carrier to rotate in the same direction, as and for the purposes set forth.

10. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, said means connected to the driving member and the planet wheel carrier for constraining the latter to rotate in the same direction as the former comprising a stepped gear.

11. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, said yielding centrifugal coupling means comprising a flat clutch disc, means including centrifugal weights arranged to act on the clutch disc to force the clutch disc into engagement with the driving member connected to the driven shaft and an antagonistic spring tending to urge the clutch disc out of engagement, said driving member having a bearing surface positioned to co-operate with said clutch disc.

12. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, said centrifugal coupling means including sliding jaw clutch members arranged so as to engage the planet wheel carrier directly under the action of centrifugal force.

13. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, a hollow shaft surrounding the driving shaft and secured at one end the planet wheel carrier, a brake drum secured to the hollow shaft at the other end, and a brake band positioned with respect to said drum so as to be capable of being applied thereto by hand to stop the rotation of the planet wheel carrier to effect the drive from the driving shaft without rotation of the carrier.

14. Transmission gear for transmitting power from a driving shaft to a driven mechanism, more particularly intended for use in motor vehicles, comprising a driven shaft connecting the driven mechanism with the gear, a lever adapted to control the braking, the idle running and the forward reverse motion of the driven mechanism, a central gear wheel fixed on the driving shaft, a planet wheel carrier adapted to be coupled to the driven shaft and freely rotatable about the axis of the driving shaft, planet wheels journalled upon the planet wheel carrier and in driving engagement with said central gear wheel, centrifugal coupling means in driving connection with said planet wheels, a driving member connected to said driven shaft, said centrifugal coupling means being adapted to be brought into yielding driving engagement with the driving member connected to the driven shaft on rotation of the driving shaft, means connected to said driving member and planet wheel carrier for constraining the latter to rotate in the same direction as the former for applying a unidirectional torque to the driven shaft, with the motion of the planet wheel carrier braked by the yielding centrifugal coupling, so as to vary the transmission ratio between the driving and driven shafts automatically in such a way that at all times the most advantageous transmission ratio between the driving and driven shafts is automatically adjusted, a two-part gear shift rod, each part of which has a recess, the shift lever being engageable with the recess of said shift rod, a sleeve surrounding the driven shaft and slidable thereon, one part of said shift rod being in engagement with said sleeve, the driving member connected to the driven shaft consisting in a casing, a brake band surrounding said casing and connected to the sleeve so as to be tightened on the casing on lateral deflection of the lever, a second sleeve surrounding the driving shaft and slidable thereon, the other part of said shift rod being in engagement with said second sleeve, means connected to the second sleeve and to the centrifugal coupling means for applying the coupling means on the said sleeve being displaced, said second shift lever being adapted to be rocked laterally subsequent to said displacement for reversing the gear.

WALTER BALLENTIN,
*Known as Mielke.*
ERICH UHLICH.